(12) United States Patent
Sakai et al.

(10) Patent No.: US 12,095,027 B2
(45) Date of Patent: *Sep. 17, 2024

(54) SOLID ELECTROLYTE MATERIAL AND BATTERY

(71) Applicant: Panasonic Intellectual Property Management Co., Ltd., Osaka (JP)

(72) Inventors: Akihiro Sakai, Nara (JP); Tetsuya Asano, Nara (JP); Masashi Sakaida, Hyogo (JP); Yusuke Nishio, Osaka (JP); Akinobu Miyazaki, Osaka (JP); Shinya Hasegawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 729 days.

This patent is subject to a terminal disclaimer.

(21) Appl. No.: 16/911,695

(22) Filed: Jun. 25, 2020

(65) Prior Publication Data

US 2020/0328459 A1  Oct. 15, 2020

Related U.S. Application Data

(63) Continuation of application No. PCT/JP2018/041895, filed on Nov. 13, 2018.

(30) Foreign Application Priority Data

Jan. 5, 2018 (JP) .................. 2018-000424

(51) Int. Cl.
*H01M 10/0562* (2010.01)
*H01M 4/36* (2006.01)
(Continued)

(52) U.S. Cl.
CPC ....... *H01M 10/0562* (2013.01); *H01M 4/366* (2013.01); *H01M 4/525* (2013.01);
(Continued)

(58) Field of Classification Search
None
See application file for complete search history.

(56) References Cited

U.S. PATENT DOCUMENTS

| | | | |
|---|---|---|---|
| 2004/0151986 A1 | 8/2004 | Park et al. | |
| 2016/0028107 A1* | 1/2016 | Kubo ................ | H01M 10/0562 427/58 |

(Continued)

FOREIGN PATENT DOCUMENTS

| | | |
|---|---|---|
| CN | 105254184 | 1/2016 |
| JP | 2004-235155 | 8/2004 |

(Continued)

OTHER PUBLICATIONS

Steiner et al., New Fast Ionic Conductor from the Type MI3MIIICl6 (MI=Li, Na, Ag; MIII=In, Y), 1992, Zeitschrift für anorganische und allgemeine Chemie, 613, 26-30 (Year: 1992).*

(Continued)

*Primary Examiner* — Laura Weiner
(74) *Attorney, Agent, or Firm* — Rimon P.C.

(57) ABSTRACT

Provided is a solid electrolyte material represented by the following composition formula (1):

$$Li_{6-3d}Y_d X_6 \quad \text{Formula (1)}$$

where
X is two or more kinds of elements selected from the group consisting of Cl, Br, and I; and
$0 < d < 2$.

16 Claims, 4 Drawing Sheets

(51) Int. Cl.
  *H01M 4/525* (2010.01)
  *H01M 4/62* (2006.01)
  *H01M 50/431* (2021.01)
  *H01M 4/02* (2006.01)

(52) U.S. Cl.
  CPC .......... *H01M 4/62* (2013.01); *H01M 50/431* (2021.01); *H01M 2004/027* (2013.01); *H01M 2004/028* (2013.01); *H01M 2300/008* (2013.01)

(56) References Cited

U.S. PATENT DOCUMENTS

| | | | |
|---|---|---|---|
| 2017/0222257 A1 | 8/2017 | Miyashita et al. | |
| 2019/0067736 A1 | 2/2019 | Yoshioka et al. | |
| 2019/0088995 A1 | 3/2019 | Asano et al. | |
| 2020/0328453 A1 | 10/2020 | Sakai et al. | |

FOREIGN PATENT DOCUMENTS

| | | | |
|---|---|---|---|
| JP | 2006-244734 | | 9/2006 |
| JP | 2006244734 A | * | 9/2006 |
| JP | 5076134 B | | 11/2012 |
| JP | 2016-024874 | | 2/2016 |
| WO | 2017/108105 | | 6/2017 |
| WO | 2017/154922 | | 9/2017 |
| WO | 2018/025582 | | 2/2018 |
| WO | 2019/135315 A1 | | 7/2019 |

OTHER PUBLICATIONS

Steiner et al. English machine translation (Year: 2022).*
Tomita et al ,"Substitution effect of ionic conductivity in lithium ion conductor, Li3InBr6—xClx", Solid State Ionics 179 (2008) 867-870.*
Bohnsack et al. "Ternary Halides of A3MX6 Type. VII [1]. The Bromides Li3MBr6 (M=Sm—Lu, Y)"; Journal of Inorganic and General Chemistry, Chem. 623 (1997), pp. 1352-1356.*
Steiner, H.-J.; Lutz, H. D. Neue schnelle Ionenleiter vom Typ MI3MIIICl6 (MI=Li, Na, Ag; MIII=In, Y). Z. Anorg. Allg. Chem. 1992, 613, 26-30.*
Steiner, H.-J.; Lutz, H. D. Novel Fast Ion Conductors of the type MI3MIIICl6 (MI=Li, Na, Ag; MIII=In, Y); Journal for inorganic and general Chem. 1992, 613, 26-30. [machine translation of above article].*
International Search Report of PCT application No. PCT/JP2018/041895 dated Feb. 19, 2019.
Andreas Bohnsack et al., "The bromides Li3MBr6 (M=Sm—Lu,Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.
English Translation of Chinese Search Report dated Jul. 5, 2021 for the related Chinese Patent Application No. 201880076221.3.
"Ternary halides of the A(3)MX(6)type.7. The bromides Li3MBr6 (M=Sm—Lu,Y): Synthesis.crystal structure, and ionic mobility", Bohnsack etc, Chemistry, Inorganic & Nuclear.Sep. 30, 1997.

* cited by examiner

SOLID ELECTROLYTE MATERIAL AND BATTERY

BACKGROUND

1. Technical Field

The present disclosure relates to a solid electrolyte material and a battery.

2. Description of the Related Art

Patent Literature 1 discloses an all-solid battery using a sulfide solid electrolyte.

Patent Literature 2 discloses an all-solid battery using, as a solid electrolyte, a halide including indium.

Non-Patent Literature 1 discloses $Li_3YBr_6$.

CITATION LIST

Patent Literature

Patent Literature 1: Japanese Patent Application Publication No. 2005-353309

Patent Literature 2: Japanese Patent Application Publication No. 2006-244734

Non-Patent Literature

Non-patent Literature 1: Z. Anorg. Allg. Chem. 623 (1997), 1352

SUMMARY

In the prior art, realization of a solid electrolyte material having high lithium ion conductivity is desired.

The solid electrolyte material in one aspect of the present disclosure is represented by the following composition formula (1):

$$Li_{6-3d}Y_dX_6 \qquad \text{Formula (1)}$$

where

X is two or more kinds of elements selected from the group consisting of Cl, Br, and I; and $0<d<2$.

According to the present disclosure, a solid electrolyte material having high lithium ion conductivity can be realized.

DETAILED DESCRIPTION OF THE EMBODIMENTS

Figure 1:
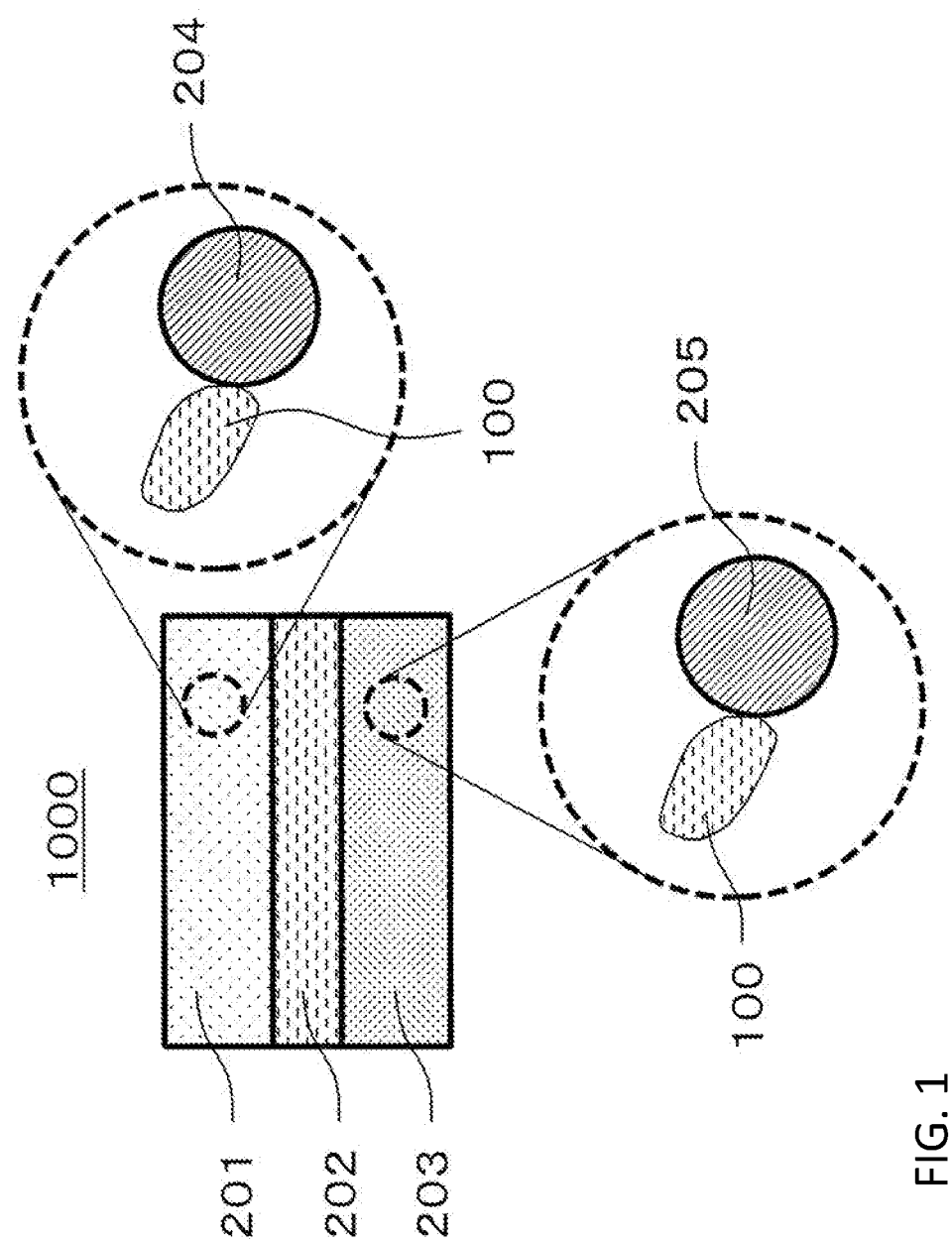
FIG. 1 is a cross-sectional view showing a schematic configuration of a battery in a second embodiment.

Hereinafter, embodiments of the present disclosure will be described with reference to the drawings.

First Embodiment

The solid electrolyte material in the first embodiment is a solid electrolyte material represented by the following composition formula (1):

$$Li_{6-3d}Y_dX_6 \qquad \text{Formula (1)}.$$

Here, X is two or more kinds of elements selected from the group consisting of Cl, Br, and I; and Further, $0<d<2$ is satisfied.

The crystal structure of the solid electrolyte material described in the first embodiment includes a fundamental structure of LiX (X is two or more kinds of elements selected from the group consisting of Cl, Br, and I). By doping the crystal structure with yttrium cations ($Y^{3+}$) each having a valence different from that of the lithium cation ($Li^+$) of the fundamental structure so as to satisfy electrical neutrality of the whole of the crystal, vacancies are generated in the crystal structure. Li ions can be conducted in the crystal through the generated vacancies. The symmetry of the crystal structure is varied from the fundamental structure by geometrical element arrangement of Li, Y, and the vacancies in the crystal structure or by balance between the ionic radius of the anion and the ionic radius of the cation. The number of the vacancies is varied, depending on the value of d. For example, if d=1, two vacancies are present on average for three Li ions.

According to the above configuration, a halide solid electrolyte material having high Li ionic conductivity can be realized. In addition, a solid electrolyte material having a stable structure can be realized in the assumed operation temperature range of the battery (for example, within the range of −30° C. to 80° C.). In other words, the solid electrolyte material of the first embodiment does not have a configuration (for example, the configuration of Patent Literature 2) in which the phase transition temperature thereof is present in the operation temperature range of the battery. As a result, even in an environment where there is a temperature change, high ionic conductivity can be stably maintained without causing a phase transition to occur within the operation temperature range of the battery.

In addition, according to the above configuration, a solid electrolyte exhibiting high Li ionic conductivity of not less than $1\times10^{-4}$ S/cm can be realized, and an all-solid secondary battery excellent in a charge/discharge characteristic can be realized. Furthermore, by adjusting the composition, Li ionic conductivity of more than $7\times10^{-4}$ S/cm is achieved, and an all-solid secondary battery capable of being charged or discharged more rapidly can be realized. Furthermore, high Li ionic conductivity of not less than $10\times10^{-4}$ S/cm can be realized within a further limited composition region, and a higher performance all-solid secondary battery can be realized.

Moreover, by using the solid electrolyte material of the first embodiment, an all-solid secondary battery which does not include sulfur can be realized. In other words, the solid electrolyte material of the first embodiment does not have a configuration (for example, the configuration of Patent Literature 1) in which hydrogen sulfide is generated if exposed to the air. As a result, an all-solid secondary battery which does not generate hydrogen sulfide and is excellent in safety can be realized.

The solid electrolyte material in the first embodiment may satisfy $0.3 \le d \le 1.8$.

According to the above configuration, a solid electrolyte material having higher lithium ion conductivity can be realized.

The solid electrolyte material in the first embodiment may satisfy $0.5 \le d \le 1.5$.

According to the above configuration, a solid electrolyte material having higher lithium ion conductivity can be realized.

The solid electrolyte material in the first embodiment may satisfy $0.9 \leq d \leq 1.2$.

According to the above configuration, a solid electrolyte material having higher lithium ion conductivity can be realized.

In the solid electrolyte material in the first embodiment, X may include Br and Cl.

According to the above configuration, a solid electrolyte material having higher lithium ion conductivity can be realized.

The solid electrolyte material in the first embodiment may be represented by the following composition formula (2): $Li_{6-3d}Y_dBr_{6-x}Cl_x$ Formula (2).

In this case, in the composition formula (2), $1 \leq x \leq 5$ may be satisfied.

According to the above configuration, a solid electrolyte material having higher lithium ion conductivity can be realized.

In the solid electrolyte material in the first embodiment, X may include Br and I.

According to the above configuration, a solid electrolyte material having higher lithium ion conductivity can be realized.

In addition, the solid electrolyte material in the first embodiment may be represented by the following composition formula (3): $Li_{6-3d}Y_dBr_{6-x}I_x$ Formula (3)

In this case, in the composition formula (3), $1 \leq x \leq 5$ may be satisfied.

According to the above configuration, a solid electrolyte material having higher lithium ion conductivity can be realized.

The solid electrolyte material in the first embodiment may be represented by the following composition formula (4): $Li_{6-3d}Y_dCl_lBr_mI_n$ Formula (4).

In this case, in the composition formula (4), $l+m+n=6$ may be satisfied.

According to the above configuration, a solid electrolyte material having higher lithium ion conductivity can be realized.

The solid electrolyte material in the first embodiment may satisfy $0.5<l<5$, $0.5<m<5$, and $0.5<n<5$ in the composition formula (4).

According to the above configuration, a solid electrolyte material having higher lithium ion conductivity can be realized.

The solid electrolyte material in the first embodiment may satisfy $2 \leq l \leq 3$, $2 \leq m \leq 3$, and $1 \leq n \leq 2$ in the composition formula (4).

According to the above configuration, a solid electrolyte material having higher lithium ion conductivity can be realized.

The solid electrolyte material in the first embodiment may satisfy $l=2$, $m=2$, and $n=2$ in the composition formula (4).

According to the above configuration, a solid electrolyte material having higher lithium ion conductivity can be realized.

A shape of the solid electrolyte material in the first embodiment is not particularly limited, and may be, for example, an acicular shape, a spherical shape, or an elliptical spherical shape. For example, the solid electrolyte material in the first embodiment may be particles. In addition, the solid electrolyte material in the first embodiment may be formed into a pellet shape or a plate shape by pressurization after stacking a plurality of particles. In addition, the solid electrolyte material in the first embodiment may include a crystal phase or may include an amorphous phase.

For example, if the shape of the solid electrolyte material in the first embodiment is particulate (for example, spherical), the median diameter thereof may be not less than 0.1 µm and not more than 100 µm.

In addition, in the first embodiment, the median diameter may be not less than 0.5 µm and not more than 10 µm.

According to the above configuration, ionic conductivity can be further improved. In addition, a better dispersion state of the solid electrolyte material in the first embodiment and an active material can be formed.

In the first embodiment, the solid electrolyte material may have a smaller median diameter than the active material.

According to the above configuration, a better dispersed state of the solid electrolyte material in the first embodiment and the active material can be formed.

<Manufacturing Method of Solid Electrolyte Material>

The solid electrolyte material in the first embodiment may be manufactured by the following method, for example.

Binary halide raw material powders are prepared so as to provide a blending ratio of a target composition. For example, if $Li_3YBr_3Cl_3$ is produced, LiBr and $YCl_3$ are prepared in a molar ratio of 3:1. The raw materials are not particularly limited. For example, LiCl, LiI, $YBr_3$, or $YI_3$ may be used in addition to the above-described raw materials. At this time, X in composition formula (1) can be determined by selecting the kinds of the raw material powders. Further, the above-mentioned values of "x", "l", "m", and "n" can be adjusted by adjusting the raw materials and the molar ratio. After mixing the raw material powders well, the raw material powders are mixed and ground using a mechanochemical milling method to react. Alternatively, the raw material powders may be mixed well and then sintered in a vacuum or in an inert atmosphere such as an argon/nitrogen atmosphere.

In this way, the solid electrolyte material including the crystal phase as described above is provided.

In addition, the configuration (namely, the crystal structure) of the crystal phase in the solid electrolyte material can be determined by adjusting the reaction method and reaction conditions of the raw material powders.

Second Embodiment

Hereinafter, the second embodiment will be described. The description which has been set forth in the above-described first embodiment is omitted as appropriate.

The battery in the second embodiment is configured using the solid electrolyte material described in the first embodiment.

The battery in the second embodiment comprises a positive electrode, a negative electrode, and an electrolyte layer.

The electrolyte layer is a layer provided between the positive electrode and the negative electrode.

At least one of the positive electrode, the electrolyte layer, and the negative electrode includes the solid electrolyte material in the first embodiment.

According to the above configuration, the charge/discharge characteristic of the battery can be improved.

A specific example of the battery in the second embodiment will be described below.

FIG. 1 is a cross-sectional view showing a schematic configuration of a battery 1000 in the second embodiment.

The battery 1000 in the second embodiment includes a positive electrode 201, a negative electrode 203, and an electrolyte layer 202.

The positive electrode 201 includes positive electrode active material particles 204 and solid electrolyte particles 100.

The electrolyte layer 202 is disposed between the positive electrode 201 and the negative electrode 203.

The electrolyte layer 202 includes an electrolyte material (for example, a solid electrolyte material).

The negative electrode 203 includes negative electrode active material particles 205 and the solid electrolyte particles 100.

The solid electrolyte particles 100 are particles each formed of the solid electrolyte material in the first embodiment or particles each including the solid electrolyte material in the first embodiment as a main component.

The positive electrode 201 includes a material having a characteristic of storing and releasing metal ions (for example, Li ions). The positive electrode 201 includes, for example, a positive electrode active material (for example, the positive electrode active material particles 204).

Examples of the positive electrode active material include Li-containing transition metal oxides (e.g., $Li(NiCoAl)O_2$ or $LiCoO_2$), transition metal fluorides, polyanion materials, fluorinated polyanion materials, transition metal sulfides, transition metal oxyfluorides, transition metal oxysulfides, and transition metal oxynitrides.

The positive electrode active material may be coated on a part or all of its surface with an oxide different from the positive electrode active material in order to perform a higher performance battery operation. As a typical coating material, $LiNbO_3$ can be used. As long as the battery operation can be performed, the surface coating material is not limited to $LiNbO_3$, and the coating method is not limited, either. Typically, the thickness of the coating material is desirably approximately 1 to 100 nm to realize a high-performance battery. Examples of the coating material include a Li—Nb—O compound such as $LiNbO_3$, a Li—B—O compound such as $LiBO_2$ or $Li_3BO_3$, a Li—Al—O compound such as $LiAlO_2$, a Li—Si—O compound such as $Li_4SiO_4$, $Li_2SO_4$, a Li—Ti—O compound such as $Li_4Ti_5O_{12}$, a Li—Zr—O compound such as $Li_2ZrO_3$, a Li—Mo—O compound such as $Li_2MoO_3$, a Li—V—O compound such as $LiV_2O_5$, and a Li—W—O compound such as $Li_2WO_4$.

The median diameter of the positive electrode active material particles 204 may be not less than 0.1 μm and not more than 100 μm. If the median diameter of the positive electrode active material particles 204 is not less than 0.1 μm, the positive electrode active material particles 204 and the halide solid electrolyte material can form a good dispersion state in the positive electrode. As a result, the charge/discharge characteristic of the battery is improved. In addition, if the median diameter of the positive electrode active material particles 204 is not more than 100 μm, Li diffusion in the positive electrode active material particles 204 is accelerated. As a result, the battery can operate at a high output.

The median diameter of the positive electrode active material particles 204 may be larger than the median diameter of the halide solid electrolyte material. In this case, the good dispersion state of the positive electrode active material particles 204 and the halide solid electrolyte material can be formed.

With regard to a volume ratio "v: 100−v" between the positive electrode active material particles 204 and the halide solid electrolyte material included in the positive electrode 201, $30 \le v \le 95$ may be satisfied. In the case of $30 \le v$, a sufficient battery energy density can be secured. In addition, if $v \le 95$, an operation at a high output can be realized.

The thickness of the positive electrode 201 may be not less than 10 μm and not more than 500 μm. If the thickness of the positive electrode is not less than 10 μm, a sufficient battery energy density can be ensured. If the thickness of the positive electrode is not more than 500 μm, an operation at a high output can be realized.

The electrolyte layer 202 is a layer including an electrolyte material. The electrolyte material is, for example, a solid electrolyte material. In other words, the electrolyte layer 202 may be a solid electrolyte layer.

The solid electrolyte layer may include the solid electrolyte material in the first embodiment as a main component. In other words, the solid electrolyte layer may include the solid electrolyte material in the above-described first embodiment, for example, at a weight ratio of not less than 50% (namely, not less than 50% by weight) with respect to the entire solid electrolyte layer.

According to the above configuration, the charge/discharge characteristic of the battery can be further improved.

In addition, the solid electrolyte layer may include the solid electrolyte material in the first embodiment described above, for example, at a weight ratio of not less than 70% (namely, not less than 70% by weight) with respect to the entire solid electrolyte layer.

According to the above configuration, the charge/discharge characteristic of the battery can be further improved.

The solid electrolyte layer includes the solid electrolyte material in the above-described first embodiment as a main component, and may further include inevitable impurities, starting materials used when the solid electrolyte material is synthesized, by-products, or decomposition products.

In addition, the solid electrolyte layer may include the solid electrolyte material in the first embodiment, for example, at a weight ratio of 100% (namely, 100% by weight) with respect to the entire solid electrolyte layer, excluding impurities mixed inevitably.

According to the above configuration, the charge/discharge characteristic of the battery can be further improved.

As described above, the solid electrolyte layer may be composed only of the solid electrolyte material in the first embodiment.

Alternatively, the solid electrolyte layer may be composed of only a solid electrolyte material different from the solid electrolyte material in the first embodiment. As the solid electrolyte material different from the solid electrolyte material in the first embodiment, for example, $Li_2MgX_4$, $Li_2FeX_4$, $Li(Al, Ga, In)X_4$, $Li_3(Al, Ga, In)X_6$, or LiI may be used. Here, X includes at least one selected from the group consisting of Cl, Br, and I.

The solid electrolyte layer may include simultaneously the solid electrolyte material in the first embodiment and the solid electrolyte material different from the solid electrolyte material in the first embodiment. At this time, both may be dispersed uniformly. Alternatively, a layer formed of the solid electrolyte material in the first embodiment and a layer formed of the solid electrolyte material different from the solid electrolyte material in the first embodiment may be sequentially arranged in the stacking direction of the battery.

The thickness of the solid electrolyte layer may be not less than 1 μm and not more than 100 μm. If the thickness of the solid electrolyte layer is not less than 1 μm, the positive electrode 201 and the negative electrode 203 are easily separated. In addition, if the thickness of the solid electrolyte layer is not more than 100 μm, an operation with high output can be realized.

The negative electrode 203 includes a material having a characteristic of storing and releasing metal ions (for example, Li ions). The negative electrode 203 includes, for example, a negative electrode active material (for example, the negative electrode active material particles 205).

As the negative electrode active material, a metal material, a carbon material, an oxide, a nitride, a tin compound, or a silicon compound can be used. The metal material may be a single metal. Alternatively, the metal material may be an alloy. Examples of the metal material include lithium metal and a lithium alloy. Examples of the carbon material include natural graphite, coke, carbon under graphitization, carbon fiber, spherical carbon, artificial graphite, and amorphous carbon. From the viewpoint of capacity density, silicon (Si), tin (Sn), a silicon compound, or a tin compound can be used. If a negative electrode active material having a low average reaction voltage is used, the effect of suppressing electrolysis by the solid electrolyte material in the first embodiment is better exhibited.

The median diameter of the negative electrode active material particles 205 may be not less than 0.1 μm and not more than 100 μm. If the median diameter of the negative electrode active material particles 205 is not less than 0.1 μm, the negative electrode active material particles 205 and the solid electrolyte particles 100 can form a good dispersion state in the negative electrode. As a result, the charge/discharge characteristic of the battery is improved. In addition, if the median diameter of the negative electrode active material particles 205 is not more than 100 μm, the lithium diffusion in the negative electrode active material particles 205 is accelerated. As a result, the battery can operate at a high output.

The median diameter of the negative electrode active material particles 205 may be larger than the median diameter of the solid electrolyte particles 100. As a result, the good dispersion state of the negative electrode active material particles 205 and the halide solid electrolyte material can be formed.

With regard to a volume ratio "v: 100−v" of the negative electrode active material particles 205 and the solid electrolyte particles 100 included in the negative electrode 203, $30 \leq v \leq 95$ may be satisfied. In a case of $30 \leq v$, a sufficient battery energy density can be secured. In addition, if $v \leq 95$, an operation at a high output can be realized.

The thickness of the negative electrode 203 may be not less than 10 μm and not more than 500 μm. If the thickness of the negative electrode is not less than 10 μm, the sufficient battery energy density can be secured. In addition, if the thickness of the negative electrode is not more than 500 μm, an operation with high output can be realized.

At least one of the positive electrode 201, the electrolyte layer 202, and the negative electrode 203 may include a sulfide solid electrolyte or an oxide solid electrolyte for the purpose of improving ionic conductivity. As the sulfide solid electrolyte, $Li_2S-P_2S_5$, $Li_2S-SiS_2$, $Li_2S-B_2S_3$, $Li_2S-GeS_2$, or $Li_{3.25}Ge_{0.25}P_{0.75}S_4$, or $Li_{10}GeP_2S_{12}$ can be used. As the solid oxide electrolyte, a NASICON solid electrolyte such as $LiTi_2(PO_4)_3$ and its element substitution products, a (LaLi)$TiO_3$ perovskite solid electrolyte, a LISICON solid electrolyte such as $Li_{14}ZnGe_4O_{16}$, $Li_4SiO_4$, or $LiGeO_4$ and its element substitution products, a garnet solid electrolyte such as $Li_7La_3Zr_2O_{12}$ and its element substitution products, $Li_3N$ and its H substitution products, or $Li3_PO_4$ and its N substitution products can be used.

At least one of the positive electrode 201, the electrolyte layer 202, and the negative electrode 203 may include an organic polymer solid electrolyte for the purpose of increasing ionic conductivity. As the organic polymer solid electrolyte, for example, a compound of a polymer compound and a lithium salt can be used. The polymer compound may have an ethylene oxide structure. Since the polymer compound has the ethylene oxide structure, a large amount of lithium salt can be included, and the ionic conductivity can be further increased. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these may be used alone. Alternatively, a mixture of two or more lithium salts selected from these may be used as the lithium salt.

At least one of the positive electrode 201, the electrolyte layer 202, and the negative electrode 203 may include a non-aqueous electrolyte liquid, a gel electrolyte, and an ionic liquid for the purpose of facilitating exchange of lithium ions and improving the output characteristic of the battery.

The non-aqueous electrolytic liquid includes a non-aqueous solvent and a lithium salt dissolved in the non-aqueous solvent. As the non-aqueous solvent, a cyclic carbonate solvent, a chain carbonate solvent, a cyclic ether solvent, a chain ether solvent, a cyclic ester solvent, a chain ester solvent, or a fluorine solvent can be used. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, or fluorodimethylene carbonate. As the non-aqueous solvent, one non-aqueous solvent selected from these can be used alone. Alternatively, a combination of two or more non-aqueous solvents selected from these can be used as the non-aqueous solvent. The non-aqueous electrolytic liquid may include at least one fluorine solvent selected from the group consisting of fluoroethylene carbonate, methyl fluoropropionate, fluorobenzene, fluoroethyl methyl carbonate, and fluorodimethylene carbonate. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these may be used alone. Alternatively, a mixture of two or more lithium salts selected from these may be used as the lithium salt. The concentration of the lithium salt is, for example, in the range of 0.5 to 2 mol/liter.

As the gel electrolyte, a polymer material including a non-aqueous electrolyte liquid can be used. As the polymer material, polyethylene oxide, polyacrylonitrile, polyvinylidene fluoride, polymethyl methacrylate, or a polymer having an ethylene oxide bond may be used.

The cation which forms the ionic liquid may be an aliphatic chain quaternary salt such as tetraalkylammonium or tetraalkylphosphonium, an aliphatic cyclic ammonium such as pyrrolidinium, morpholinium, imidazolinium, tetrahydropyrimidinium, piperazinium or piperidinium, or a nitrogen-including heterocyclic aromatic cation such as pyridinium or imidazolium. The anion which forms the ionic liquid may be $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may include a lithium salt.

At least one of the positive electrode 201, the electrolyte layer 202, and the negative electrode 203 may include a binder for the purpose of improving adhesion between the particles. The binder is used to improve the binding property of the material which forms the electrode. Examples of the binders include polyvinylidene fluoride, polytetrafluoroethylene, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene butadiene rubber, or carboxymethylcellulose. Examples of the binder includes a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. In addition, two or more kinds selected from these may be mixed and used as the binder.

In addition, at least one of the positive electrode 201 and the negative electrode 203 may include a conductive agent as necessary.

The conductive agent is used to lower electrode resistance. Examples of the conductive agent include graphite such as natural graphite or artificial graphite, carbon black such as acetylene black or ketjen black, a conductive fiber such as a carbon fiber or a metal fiber, carbon fluoride, a metal powder such as aluminum, a conductive whisker such as zinc oxide or potassium titanate, a conductive metal oxide such as titanium oxide, or a conductive polymer compound such as polyaniline, polypyrrole, or polythiophene. In addition, cost reduction can be achieved by using a carbon conductive agent as the conductive agent.

Note that the battery in the second embodiment can be configured as a battery having various shapes such as a coin shape, a cylindrical shape, a prism shape, a sheet shape, a button shape, a flat shape, or a laminated shape.

EXAMPLES

Hereinafter, details of the present disclosure will be described with reference to the inventive examples and comparative examples.

Inventive Example 1

Hereinafter, a method for synthesizing and evaluating $Li_{6-3d}Y_d(Br, Cl)_6$ in the present example will be described.
[Production of Solid Electrolyte Material]
In a glove box maintained in a dry and low-oxygen atmosphere with a dew point of −90° C. or less and an oxygen value of 5 ppm or less, raw material powders LiBr, $YBr_3$, LiCl, and $YCl_3$ were prepared so as to have a molar ratio of Li:Y:Br:Cl=6-3d:d:6-x:x, namely, so as to prepare $Li_{6-3d}Y_dBr_{6-x}Cl_x$. These were ground and mixed in a mortar. Subsequently, milling processing was performed at 600 rpm for 25 hours using a planetary ball mill.

In the present examples, a ratio of Br and Cl is x=1, 3, and 5. In each x, the value of d is d=0.3, 0.5, 0.8, 0.9, 1.1, 1.2, 1.4, 1.5, and 1.8.

As a result, $Li_{6-3d}Y_dBr_{6-x}Cl_x$ powders, which were the solid electrolyte materials of the inventive examples 1-1 to 1-27, were provided.
[Evaluation of Lithium Ion Conductivity]

Figure 2:
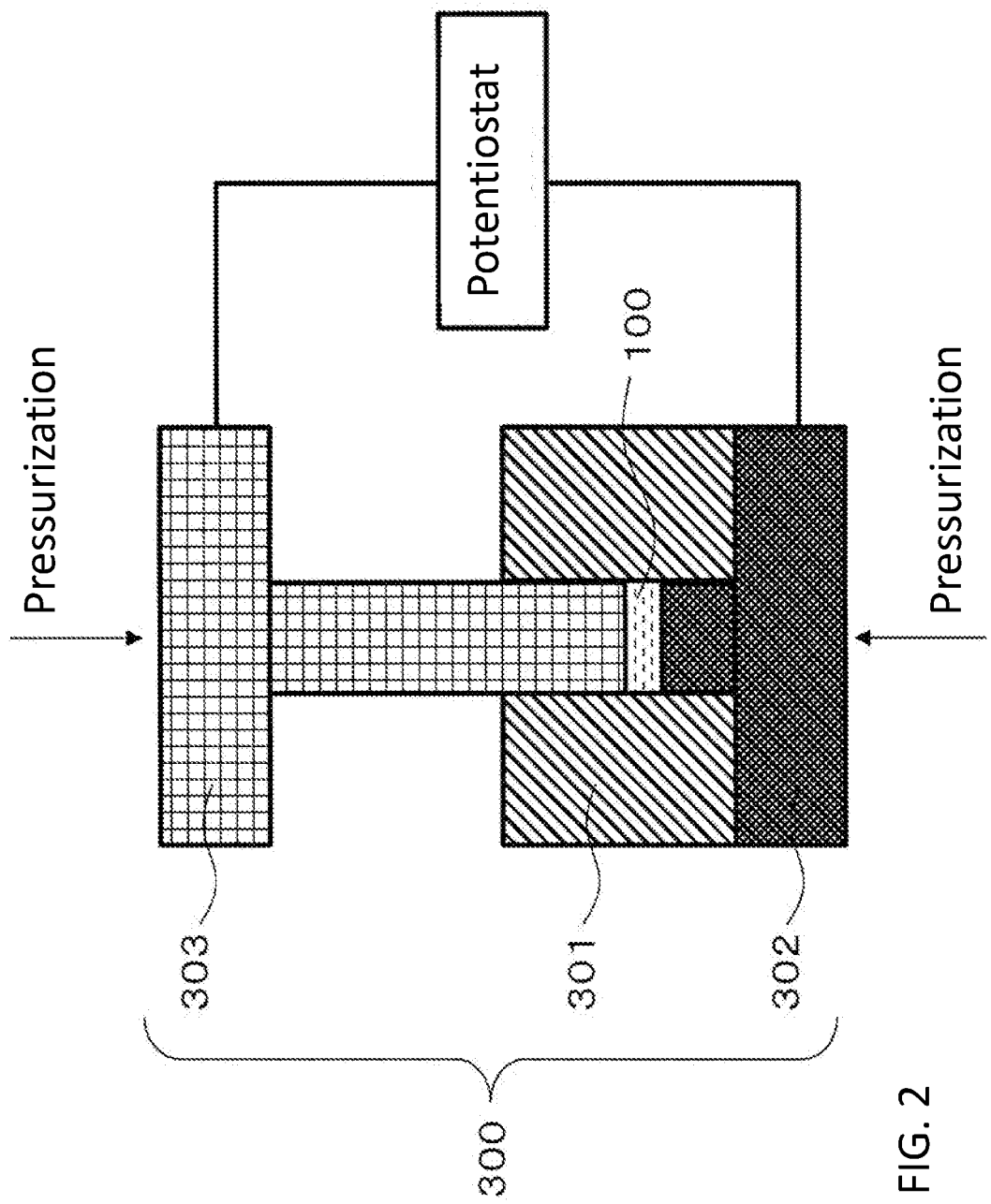
FIG. 2 is a schematic diagram illustrating an evaluation method of ionic conductivity.

FIG. 2 is a schematic diagram showing an evaluation method of ionic conductivity. A pressure-molding die 300 includes a frame 301 formed of an electronically insulating polycarbonate, an upper punch part 303 and a lower punch part 302, both of which are formed of electron conductive stainless steel.

Using the configuration shown in FIG. 2, the ionic conductivity was evaluated by the following method. In a glove box maintained in a dry and low-oxygen atmosphere with a dew point of −90° C. or less and an oxygen value of 5 ppm or less, the inside of the pressure-molding die 300 was filled with the powder of the solid electrolyte material of the inventive example 1 (example of the solid electrolyte particles 100). The powder was pressurized uniaxially at 400 MPa to produce a conductivity measurement cell of the inventive example 1. In a pressurized state, lead wires were routed from the upper punch part 303 and the lower punch part 302, connected to a potentiostat (Princeton Applied Research, VersaSTAT4) equipped with a frequency response analyzer. The ionic conductivity at room temperature was measured by an electrochemical impedance measurement method.

The ionic conductivity of the solid electrolyte material of the inventive example 1 measured at 22° C. is shown in Table 1, which is shown below.

TABLE 1

| Solid electrolyte material | | Conductivity (Room temperature) ($10^{-4}$ S/cm) | Phase Transition (not more than 80° C.) | Initial discharge capacity (μAh) |
|---|---|---|---|---|
| Inventive Example 1-1 | $Li_{5.1}Y_{0.3}Br_5Cl$ | 0.5 | None | 410 |
| Inventive Example 1-2 | $Li_{4.5}Y_{0.5}Br_5Cl$ | 1.0 | None | 480 |
| Inventive Example 1-3 | $Li_{3.6}Y_{0.8}Br_5Cl$ | 2.4 | None | 570 |
| Inventive Example 1-4 | $Li_{3.3}Y_{0.9}Br_5Cl$ | 7.8 | None | 550 |
| Inventive Example 1-5 | $Li_{2.7}Y_{1.1}Br_5Cl$ | 10.0 | None | 600 |
| Inventive Example 1-6 | $Li_{2.4}Y_{1.2}Br_5Cl$ | 7.0 | None | 610 |
| Inventive Example 1-7 | $Li_{1.8}Y_{1.4}Br_5Cl$ | 3.5 | None | 560 |
| Inventive Example 1-8 | $Li_{1.5}Y_{1.5}Br_5Cl$ | 0.9 | None | 510 |
| Inventive Example 1-9 | $Li_{0.6}Y_{1.8}Br_5Cl$ | 0.5 | None | 370 |
| Inventive Example 1-10 | $Li_{5.1}Y_{0.3}Br_3Cl_3$ | 0.7 | None | 410 |
| Inventive Example 1-11 | $Li_{4.5}Y_{0.5}Br_3Cl_3$ | 1.2 | None | 710 |
| Inventive Example 1-12 | $Li_{3.6}Y_{0.8}Br_3Cl_3$ | 3.0 | None | 680 |
| Inventive Example 1-13 | $Li_{3.3}Y_{0.9}Br_3Cl_3$ | 9.0 | None | 660 |
| Inventive Example 1-14 | $Li_{2.7}Y_{1.1}Br_3Cl_3$ | 11.0 | None | 730 |
| Inventive Example 1-15 | $Li_{2.4}Y_{1.2}Br_3Cl_3$ | 8.5 | None | 710 |
| Inventive Example 1-16 | $Li_{1.8}Y_{1.4}Br_3Cl_3$ | 4.2 | None | 730 |
| Inventive Example 1-17 | $Li_{1.5}Y_{1.5}Br_3Cl_3$ | 1.0 | None | 680 |
| Inventive Example 1-18 | $Li_{0.6}Y_{1.8}Br_3Cl_3$ | 0.8 | None | 410 |

TABLE 1-continued

| Solid electrolyte material | Conductivity (Room temperature) ($10^{-4}$ S/cm) | Phase Transition (not more than 80° C.) | Initial discharge capacity (μAh) |
|---|---|---|---|
| Inventive Example 1-19 | $Li_{5.1}Y_{0.3}BrCl_5$ | 0.4 | None | 410 |
| Inventive Example 1-20 | $Li_{4.5}Y_{0.5}BrCl_5$ | 1.5 | None | 640 |
| Inventive Example 1-21 | $Li_{3.6}Y_{0.8}BrCl_5$ | 4.0 | None | 710 |
| Inventive Example 1-22 | $Li_{3.3}Y_{0.9}BrCl_5$ | 8.3 | None | 730 |
| Inventive Example 1-23 | $Li_{2.7}Y_{1.1}BrCl_5$ | 11.1 | None | 730 |
| Inventive Example 1-24 | $Li_{2.4}Y_{1.2}BrCl_5$ | 7.0 | None | 710 |
| Inventive Example 1-25 | $Li_{1.8}Y_{1.4}BrCl_5$ | 1.3 | None | 710 |
| Inventive Example 1-26 | $Li_{1.5}Y_{1.5}BrCl_5$ | 1.0 | None | 620 |
| Inventive Example 1-27 | $Li_{0.6}Y_{1.8}BrCl_5$ | 0.8 | None | 410 |
| Comparative Example 1-1 | $Li_3InBr_6$ | <1E−3 | 55° C. | — |
| Comparative Example 1-2 | $Li_2FeCl_4$ | 8.7E−2 | None | 1 |

[Evaluation of Phase Transition]

Figure 3:
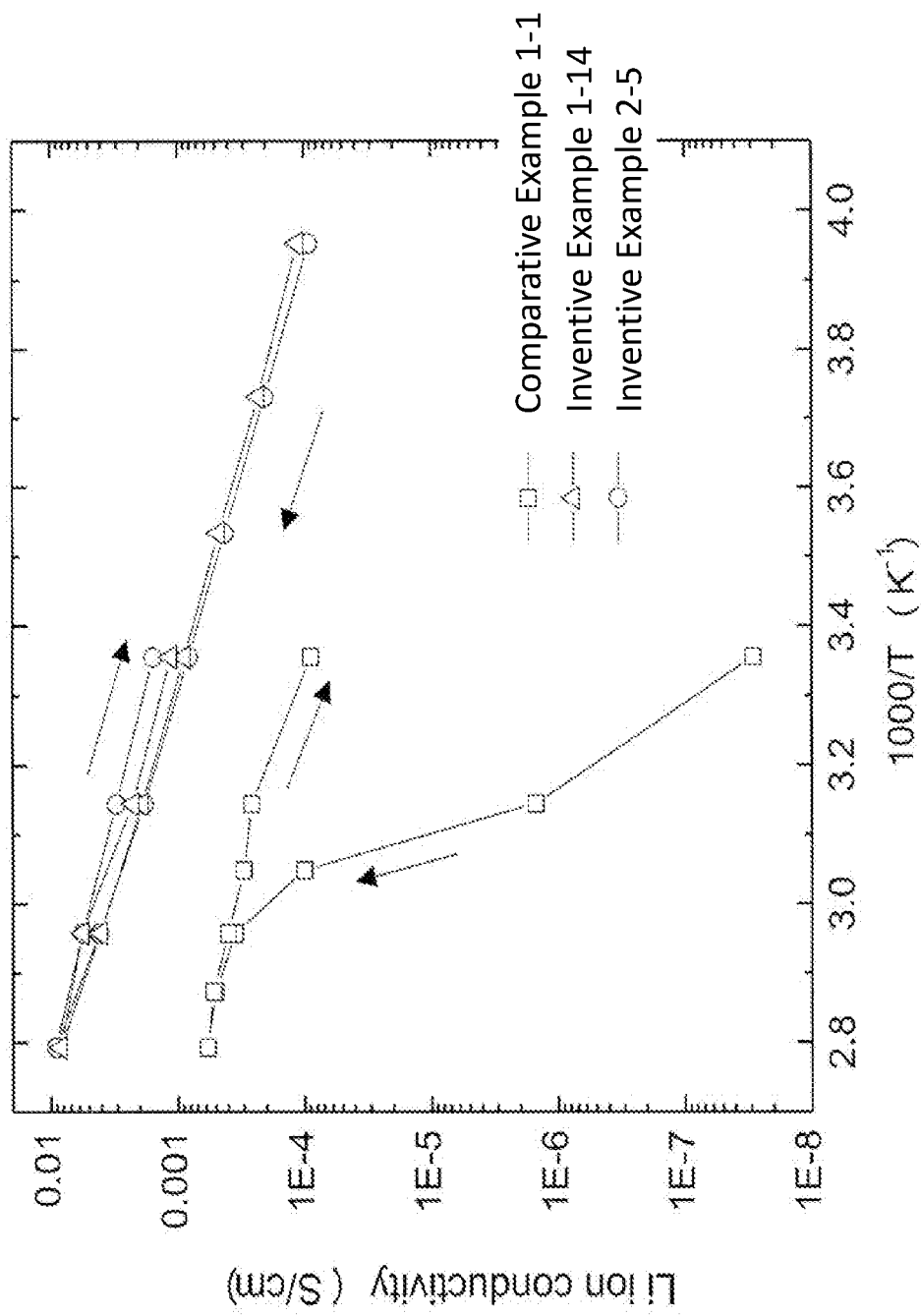
FIG. 3 is a graph showing temperature dependence of the ionic conductivity of solid electrolytes.

FIG. 3 is a graph showing temperature dependence of the ionic conductivity of solid electrolytes. FIG. 3 shows the measurement result of the inventive example 1-14 ($Li_{2.7}Y_{1.1}Br_3Cl_3$) as a typical behavior of the inventive example 1. Within the temperature range from −30° C. to 80° C., in all the inventive examples 1-1 to 1-27, no sudden change in conductivity indicating a phase change (i.e., phase transition) was observed.

The results shown in FIG. 3 were measured by the following method. The solid electrolyte materials of the inventive examples 1-1 to 1-27 which corresponded to a thickness of 700 μm were inserted into respective insulating outer cylinders. Each of the solid electrolyte materials was pressure-molded at a pressure of 40 MPa to provide solid electrolyte layers. Next, aluminum powder which corresponded to a thickness of 50 μm was stacked on the upper and lower surfaces of each of the solid electrolyte layers. Each of the solid electrolyte materials having the aluminum powder was pressure-molded at a pressure of 360 MPa to produce stacking structures. Next, stainless-steel current collectors were disposed on the upper and lower parts of each of the stacking structures, and current collector leads were attached to the current collectors. Finally, an insulating ferrule was used to block and seal the insides of the insulating outer cylinders from the outside atmosphere. The test bodies each including the stacking structure provided by the above method were put in a constant temperature chamber, and the temperature dependence of the ionic conductivity was measured in a temperature rising process and a temperature falling process.

[Evaluation of Composition]

The solid electrolyte materials of the inventive example 1 were evaluated for the compositions thereof using ICP (Inductively Coupled Plasma) emission spectroscopy. As a result, in each of the inventive examples 1-1 to 1-27, deviation of Li/Y from its charged composition was within 3%. In other words, it can be said that the charged composition with the planetary ball mill was almost the same as the composition of the solid electrolyte material described in each of the inventive examples.

[Production of Secondary Battery]

In a glove box maintained in a dry and low-oxygen atmosphere with a dew point of −90° C. or less and an oxygen value of 5 ppm or less, the solid electrolyte materials 1-1 to 1-27 of the inventive example 1 and $LiCoO_2$, which was a positive electrode active material, were prepared at a volume ratio of 50:50. These were mixed in an agate mortar to produce a positive electrode mixture.

Each of the solid electrolyte materials of the inventive example 1 in an amount corresponding to a thickness of 700 μm and 12.3 mg of the positive electrode mixture were stacked in this order in the insulating outer cylinder. Each of the solid electrolyte materials was pressure-molded at a pressure of 360 MPa to provide a positive electrode and a solid electrolyte layer.

Next, a metal In (thickness: 200 μm) was stacked on the opposite side to the side which was in contact with the positive electrode of the solid electrolyte layer. Each of the solid electrolyte materials having the positive electrode mixture and the metal In was pressure-molded at a pressure of 80 MPa to produce a stacking structure of the positive electrode, the solid electrolyte layer, and the negative electrode.

Next, stainless-steel current collectors were disposed on the upper and lower parts of each of the stacking structures, and current collector leads were attached to the current collectors. Finally, insulating ferrules were used to block and seal the insides of the insulating outer cylinders from the outside atmosphere.

Thus, the secondary batteries of the inventive example 2 were produced. The secondary batteries were produced using the solid electrolytes provided in the inventive examples 1-1 to 1-27.

[Charge/Discharge Test]

Figure 4:
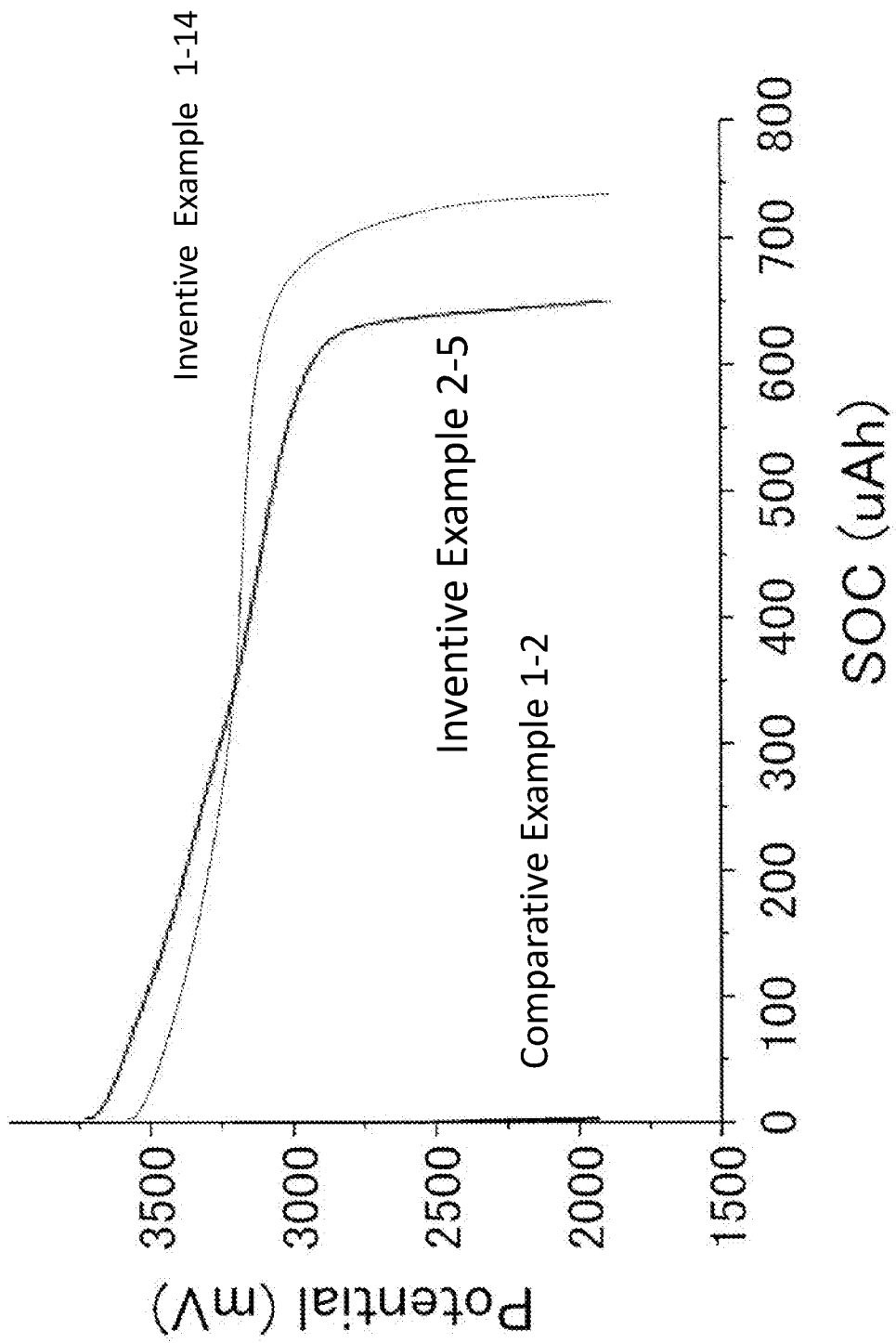
FIG. 4 is a graph showing an initial discharge characteristic.

FIG. 4 shows a graph ($Li_{2.7}Y_{1.1}Br_3Cl_3$) of the inventive example 1-14 as a typical initial discharge characteristic.

The results shown in FIG. 4 were measured by the following method. In other words, the secondary battery of the inventive example 1 was disposed in a constant temperature chamber at 25° C. Constant-current charge was performed at a current value of 0.05 C rate (20 hour rate) with respect to the theoretical capacity of the battery, and the charge was terminated at a voltage of 3.6 V. Next, the battery was discharged at a current value of the same 0.05 C rate as the above, and the discharge was terminated at a voltage of 1.9 V. The initial discharge capacity can be provided from the results of the above measurement.

The same measurements were performed in all the inventive examples 1-1 to 1-27. The initial discharge capacities thereof are shown in Table 1.

Hereinafter, a method for producing and evaluating a secondary battery using a solid electrolyte used as a comparative examples will be described.

Comparative Example 1-1

In a glove box maintained in a dry and low-oxygen atmosphere with a dew point of −90° C. or less and an oxygen value of 5 ppm or less, raw material powders LiBr and $InBr_3$ were prepared in a molar ratio of LiBr:$InBr_3$=3:1. These were ground and mixed in a mortar. Then, the sample pressure-molded into a shape of a pellet was vacuum-sealed in a glass tube and sintered at 200° C. for 1 week.

As a result, $Li_3InBr_6$, which was the solid electrolyte material of the comparative example 1, was provided.

Except for the above method, the ionic conductivity and the phase transition were evaluated in the same manner as in the inventive example 1. The ionic conductivity measured at 22° C. was less than $1\times10^{-7}$ S/cm.

The temperature dependence of the ionic conductivity of the solid electrolyte material of the comparative example 1-1 is shown in FIG. 3. As shown in FIG. 3, due to the temperature dependence of the conductivity, the conductivity changed suddenly at around 55° C. during the temperature rising process. In other words, a phase change was observed in the solid electrolyte material of the comparative example 1-1.

Comparative Example 1-2

LiCl and $FeCl_2$ were used as the raw material powders for a solid electrolyte, and mixed at a molar ratio of LiCl: $FeCl_2$=2:1. As a result, $Li_2FeCl_4$, which was the solid electrolyte material of the comparative example 1-2, was provided.

Except for this, the ionic conductivity was evaluated in the same manner as in the inventive example 1. The measured ionic conductivity was $8.7\times10^{-6}$ S/cm.

As the solid electrolyte used for the positive electrode mixture and the solid electrolyte layer, the solid electrolyte material of the comparative example 1-2 was used. Except for this, a secondary battery was produced and the charge/discharge test was conducted in the same manner as in the inventive examples 1-1 to 1-27. The initial discharge characteristic of the secondary battery of the comparative example 1-2 is shown in FIG. 4. The initial discharge capacity of the secondary battery of the comparative example 1-2 was not more than 1 μAh. In other words, in the secondary battery of the comparative example 1-2, the charge/discharge operation failed to be observed.

<<Discussion>>

As understood from the comparison of the inventive examples 1-1 to 1-27 to the comparative example 1-1, it can be seen that the phase transition does not occur in the solid electrolytes of the inventive examples 1-1 to 1-27 within the range of −30° C. to 80° C., whereas the phase transition occurs in the comparative example 1-1. In other words, it can be seen that the solid electrolyte of each of the present examples has a stable structure in the assumed operation temperature range of the battery.

Further, as understood from the comparison of the inventive examples 1-1 to 1-27 to the comparative examples 1-1 and 1-2, at room temperature, a higher ionic conductivity of not less than $1\times10^{-5}$ S/cm is exhibited in the inventive examples 1-1 to 1-27, whereas the ionic conductivity of less than $1\times10^{-5}$ S/cm is exhibited in the comparative examples 1-1 and 1-2. In addition, in the inventive examples 1-2 to 1-8, 1-11 to 1-17, and 1-20 to 1-26, within the range of $0.5\leq d\leq1.5$, the conductivity of not less than $0.9\times10^{-4}$ S/cm is exhibited. In addition, in the inventive examples 1-4 to 1-6, 1-13 to 1-15, and 1-22 to 1-24, within the range of $0.9\leq d\leq1.2$, the conductivity of not less than $7\times10^{-4}$ S/cm is exhibited.

In addition, in each of the solid electrolyte materials described in the present examples, the charging/discharging operation of the battery was observed at room temperature. On the other hand, in the comparative example 1-1, the discharge capacity was hardly provided, and the battery operation failed to be observed.

From the above, it is shown that the solid electrolyte material according to the present disclosure is an electrolyte material that does not generate hydrogen sulfide and can stably maintain high lithium ion conductivity. Further, it is shown that an all-solid battery which does not generate hydrogen sulfide and is excellent in the charge/discharge characteristic can be realized.

Inventive Example 2

Hereinafter, a method for synthesizing and evaluating $Li_{6-3d}Y_d(Br, I)_6$ in the present example will be described.

[Production of Solid Electrolyte Material]

In a glove box maintained in a dry and low-oxygen atmosphere with a dew point of −90° C. or less and an oxygen value of 5 ppm or less, raw material powders LiBr, $YBr_3$, LiI, $YI_3$ were prepared in a molar ratio of Li:Y:Br:I=6-3d:d:6-x:x, namely, prepared so as to prepare $Li_{6-3d}Y_dBr_{6-x}I_x$. These were ground and mixed in a mortar. Subsequently, milling processing was performed at 600 rpm for 25 hours using a planetary ball mill.

In the present examples, the ratio of Br and I is x=2, 3, and 5. In each x, the value of d is d=0.3, 0.5, 0.8, 0.9, 1.1, 1.2, 1.4, 1.5, and 1.8.

As a result, $Li_{6-3d}Y_dBr_{6-x}I_x$ powders, which were the solid electrolyte materials of the inventive examples 2-1 to 2-27, were provided.

[Evaluation of Lithium Ion Conductivity]

Ionic conductivity was measured by the method and in the condition, both of which are similar to those in the inventive example 1. The ionic conductivity of each of the solid electrolyte materials of the inventive example 2 was shown in Table 2 below.

TABLE 2

| Solid electrolyte material | | Conductivity (Room temperature) ($10^{-4}$ S/cm) | Phase Transition (not more than 80° C.) | Initial discharge capacity (μAh) |
|---|---|---|---|---|
| Inventive Example 2-1 | $Li_{5.1}Y_{0.3}Br_4I_2$ | 0.5 | None | 480 |
| Inventive Example 2-2 | $Li_{4.5}Y_{0.5}Br_4I_2$ | 1.0 | None | 620 |
| Inventive Example 2-3 | $Li_{3.6}Y_{0.8}Br_4I_2$ | 4.2 | None | 650 |
| Inventive Example 2-4 | $Li_{3.3}Y_{0.9}Br_4I_2$ | 7.3 | None | 670 |
| Inventive Example 2-5 | $Li_{2.7}Y_{1.1}Br_4I_2$ | 10.5 | None | 650 |
| Inventive Example 2-6 | $Li_{2.4}Y_{1.2}Br_4I_2$ | 7.0 | None | 630 |
| Inventive Example 2-7 | $Li_{1.8}Y_{1.4}Br_4I_2$ | 2.0 | None | 630 |
| Inventive Example 2-8 | $Li_{1.5}Y_{1.5}Br_4I_2$ | 1.0 | None | 650 |
| Inventive Example 2-9 | $Li_{0.6}Y_{1.8}Br_4I_2$ | 0.5 | None | 530 |
| Inventive Example 2-10 | $Li_{5.1}Y_{0.3}Br_3I_3$ | 0.6 | None | 430 |
| Inventive Example 2-11 | $Li_{4.5}Y_{0.5}Br_3I_3$ | 1.0 | None | 530 |
| Inventive Example 2-12 | $Li_{3.6}Y_{0.8}Br_3I_3$ | 3.6 | None | 510 |
| Inventive Example 2-13 | $Li_{3.3}Y_{0.9}Br_3I_3$ | 7.1 | None | 600 |
| Inventive Example 2-14 | $Li_{2.7}Y_{1.1}Br_3I_3$ | 10.1 | None | 560 |
| Inventive Example 2-15 | $Li_{2.4}Y_{1.2}Br_3I_3$ | 7.2 | None | 580 |
| Inventive Example 2-16 | $Li_{1.8}Y_{1.4}Br_3I_3$ | 1.8 | None | 510 |
| Inventive Example 2-17 | $Li_{1.5}Y_{1.5}Br_3I_3$ | 1.0 | None | 490 |
| Inventive Example 2-18 | $Li_{0.6}Y_{1.8}Br_3I_3$ | 0.8 | None | 410 |
| Inventive Example 2-19 | $Li_{5.1}Y_{0.3}BrI_5$ | 0.5 | None | 360 |

TABLE 2-continued

| Solid electrolyte material | Conductivity (Room temperature) ($10^{-4}$ S/cm) | Phase Transition (not more than 80° C.) | Initial discharge capacity (μAh) |
|---|---|---|---|
| Inventive Example 2-20 | $Li_{4.5}Y_{0.5}BrI_5$ | 1.0 | None | 530 |
| Inventive Example 2-21 | $Li_{3.6}Y_{0.8}BrI_5$ | 1.5 | None | 510 |
| Inventive Example 2-22 | $Li_{3.3}Y_{0.9}BrI_5$ | 2.0 | None | 600 |
| Inventive Example 2-23 | $Li_{2.7}Y_{1.1}BrI_5$ | 3.1 | None | 560 |
| Inventive Example 2-24 | $Li_{2.4}Y_{1.2}BrI_5$ | 2.5 | None | 580 |
| Inventive Example 2-25 | $Li_{1.8}Y_{1.4}BrI_5$ | 1.7 | None | 510 |
| Inventive Example 2-26 | $Li_{1.5}Y_{1.5}BrI_5$ | 1.0 | None | 490 |
| Inventive Example 2-27 | $Li_{0.6}Y_{1.8}BrI_5$ | 0.6 | None | 430 |
| Comparative Example 1-1 | $Li_3InBr_6$ | <1E−3 | 55° C. | — |
| Comparative Example 1-2 | $Li_2FeCl_4$ | 8.7E−2 | None | 1 |

[Evaluation of Phase Transition]

The phase transition of the present examples was evaluated in the same manner as in the inventive example 1. As a result, in all the inventive examples 2-1 to 2-27 within the temperature range of −30° C. to 80° C., no rapid change in conductivity indicating a phase change (i.e., phase transition) was observed. FIG. 3 shows the measurement results of the inventive example 2-5 ($Li_{2.7}Y_{1.1}Br_4I_2$) as a typical behavior of the inventive example 2.

[Evaluation of Composition]

Composition analysis of each of the solid electrolyte materials of the inventive example 2 was performed by the ICP emission spectroscopy. As a result, in each of the inventive examples 2-1 to 2-27, the deviation of Li/Y from the charged composition was within 3%. As a result, the charged composition with the planetary ball mill would be almost the same as the composition of the solid electrolyte material described in the inventive example.

[Production of Positive Electrode Active Material Coating Layer]

In an argon glove box, 0.06 mg of a metal Li (manufactured by The Honjo Chemical Corporation) and 2.87 mg of pentaethoxyniobium (manufactured by Kojundo Chemical Laboratory Co., Ltd.) were dissolved in 0.2 mL of super-dehydrated ethanol (manufactured by FUJIFILM Wako Pure Chemical Corporation) to provide a coating solution.

In an agate mortar, the prepared coating solution was gradually added to 100 mg of Li(NiCoAl)$O_2$, which was the positive electrode active material, while the prepared coating solution was stirred.

After all the coating solution was added, stirring was performed on a hot plate of 30° C., until drying and solidification of all the coating solution were visually confirmed.

The dried and solidified powder was put in an alumina crucible and taken out in an air atmosphere.

Next, heat treatment was performed at 300° C. for 1 hour in an air atmosphere.

The powder after the heat treatment was reground in an agate mortar to provide a positive electrode active material of the inventive example 2 in which a coating layer was formed on the particle surface layer. In other words, a plurality of particles of the positive electrode active material were provided, and a coating layer was formed on at least a part of the particle surface of all or some of the plurality of the particles.

The material of the coating layer is $LiNbO_3$.

[Production of Secondary Battery]

Hereinafter, the production and evaluation methods for the secondary batteries in the inventive examples 2-1 to 2-27 will be described.

In a glove box maintained in a dry and low-oxygen atmosphere with a dew point of −90° C. or less and an oxygen value of 5 ppm or less, the solid electrolyte materials of the inventive example 2 and Li(NiCoAl)$O_2$, which was the positive electrode active material having particle surface coated with $LiNbO_3$ were was prepared at a volume ratio of 50:50. These were mixed in an agate mortar to produce a positive electrode mixture.

The solid electrolyte materials of the inventive example 2 each of which corresponded to a thickness of 700 μm, and 12.3 mg of the positive electrode mixture were stacked in this order in respective insulating outer cylinders. Each of the solid electrolyte materials was pressure-molded at a pressure of 360 MPa to provide a positive electrode and a solid electrolyte layer.

Next, a metal In (thickness: 200 μm) was stacked on the opposite side to the side which was in contact with the positive electrode of the solid electrolyte layer. Each of the solid electrolyte materials having the positive electrode mixture and the metal In was pressure-molded at a pressure of 80 MPa to produce a stacking structure of the positive electrode, the solid electrolyte layer, and the negative electrode.

Next, stainless-steel current collectors were disposed on the upper and lower parts of each of the stacking structures, and current collector leads were attached to the current collectors. Finally, insulating ferrules were used to block and seal the insides of the insulating outer cylinders from the outside atmosphere.

Thus, the secondary batteries of the inventive examples 2 were produced. The secondary batteries were produced using the solid electrolytes provided in the inventive examples 2-1 to 2-27.

[Charge/Discharge Test]

The initial discharge capacity of each of the secondary batteries of the inventive example 2 was evaluated in the same manner as in the inventive example 1. FIG. 4 shows a graph ($Li_{2.7}Y_{1.1}Br_4I_2$) of the inventive example 2-5 as a typical initial discharge characteristic. Table 2 shows the initial discharge capacity provided in the present example.

<<Discussion>>

As understood from the comparison of the inventive examples 2-1 to 2-27 to the comparative example 1-1, it can be seen that no phase transition occurs in the solid electrolytes of the inventive examples 2-1 to 2-27 within the range of −30° C. to 80° C., whereas the phase transition occurs in the comparative example 1-1. In other words, it can be seen that the structure is stable in the assumed operation temperature range of the battery.

In addition, it can also be seen that the higher ionic conductivity of not less than $1 \times 10^{-5}$ S/cm is exhibited in all the inventive examples 2-1 to 2-27. In addition, in the inventive examples 2-2 to 2-8, 2-11 to 2-17, and 2-20 to 2-26, within the range of 0.5≤d 1.5, the conductivity of not less than $1 \times 10^{-4}$ S/cm is exhibited. In addition, in the inventive examples 2-4 to 2-6 and 2-13 to 2-15 within the range of 0.9≤d≤1.2 and 2≤x≤3, the conductivity of not less than $7 \times 10^{-4}$ S/cm is exhibited.

In addition, in each of the solid electrolyte materials of the inventive examples 2-1 to 2-27, the charging/discharging operation of the battery was observed at room temperature. On the other hand, in the comparative example 1-1, the discharge capacity was hardly provided, and the battery operation failed to be observed.

From the above, it is shown that the solid electrolyte material according to the present disclosure is an electrolyte material that does not generate hydrogen sulfide and can stably maintain high lithium ion conductivity. Further, it is shown that an all-solid battery which does not generate hydrogen sulfide and is excellent in the charge/discharge characteristic can be realized.

Inventive Example 3

Hereinafter, a method for synthesizing and evaluating $Li_{6-3d}Y_dCl_lBr_mI_n$ in the present example will be described.

[Production of Solid Electrolyte Material]

In a glove box maintained in a dry and low-oxygen atmosphere with a dew point of −90° C. or less and an oxygen value of 5 ppm or less, raw material powders LiBr, $YBr_3$, LiCl, $YCl_3$, LiI, and $YI_3$ were prepared at a molar ratio of Li:Y=6-3d:d. These were ground and mixed in a mortar. Subsequently, milling processing was performed at 600 rpm for 25 hours using a planetary ball mill.

The values of d were d=0.3, 0.5, 0.8, 1.1, 1.5, and 1.8. In addition, combinations of anions composed of halogen are shown in Table 3.

In this way, powders of $Li_{6-3d}Y_dCl_lBr_mI_n$, which are the solid electrolyte materials of the inventive example 3, were provided.

TABLE 3

| Solid electrolyte material | | Conductivity (Room temperature) ($10^{-4}$ S/cm) | Phase Transition (not more than 80° C.) |
|---|---|---|---|
| Inventive Example 3-1 | $Li_{5.1}Y_{0.3}Cl_2Br_2I_2$ | 1.0 | None |
| Inventive Example 3-2 | $Li_{4.5}Y_{0.5}Cl_2Br_2I_2$ | 3.7 | None |
| Inventive Example 3-3 | $Li_{3.6}Y_{0.8}Cl_2Br_2I_2$ | 10.3 | None |
| Inventive Example 3-4 | $Li_{2.7}Y_{1.1}Cl_2Br_2I_2$ | 35.0 | None |
| Inventive Example 3-5 | $Li_{1.5}Y_{1.5}Cl_2Br_2I_2$ | 10.0 | None |
| Inventive Example 3-6 | $Li_{0.6}Y_{1.8}Cl_2Br_2I_2$ | 1.0 | None |
| Inventive Example 3-7 | $Li_{5.1}Y_{0.3}Cl_2Br_3I$ | 1.0 | None |
| Inventive Example 3-8 | $Li_{4.5}Y_{0.5}Cl_2Br_3I$ | 2.5 | None |
| Inventive Example 3-9 | $Li_{3.6}Y_{0.8}Cl_2Br_3I$ | 8.3 | None |
| Inventive Example 3-10 | $Li_{2.7}Y_{1.1}Cl_2Br_3I$ | 20.5 | None |
| Inventive Example 3-11 | $Li_{1.5}Y_{1.5}Cl_2Br_3I$ | 10.1 | None |
| Inventive Example 3-12 | $Li_{0.6}Y_{1.8}Cl_2Br_3I$ | 1.0 | None |
| Inventive Example 3-13 | $Li_{5.1}Y_{0.3}Cl_3Br_2I$ | 1.0 | None |
| Inventive Example 3-14 | $Li_{4.5}Y_{0.5}Cl_3Br_2I$ | 2.8 | None |
| Inventive Example 3-15 | $Li_{3.6}Y_{0.8}Cl_3Br_2I$ | 8.8 | None |
| Inventive Example 3-16 | $Li_{2.7}Y_{1.1}Cl_3Br_2I$ | 20.9 | None |
| Inventive Example 3-17 | $Li_{1.5}Y_{1.5}Cl_3Br_2I$ | 7.9 | None |
| Inventive Example 3-18 | $Li_{0.6}Y_{1.8}Cl_3Br_2I$ | 1.1 | None |

[Evaluation of Ionic Conductivity]

Using the configuration shown in FIG. 2, the ionic conductivity was evaluated by the following method. In a glove box maintained in a dry and low-oxygen atmosphere with a dew point of −90° C. or less and an oxygen value of 5 ppm or less, the inside of the pressure-molding die 300 was filled with the powder of the solid electrolyte material of the inventive example 3 (example of the solid electrolyte particles 100). The powder was pressurized uniaxially at 400 MPa to produce a conductivity measurement cell of the inventive example 3. In a pressurized state, lead wires were routed from the upper punch part 303 and the lower punch part 302, connected to a potentiostat (Princeton Applied Research, VersaSTAT4) equipped with a frequency response analyzer. The ionic conductivity at room temperature was measured by an electrochemical impedance measurement method. The ionic conductivity of each of the solid electrolyte materials of the inventive example 3 measured at 22° C. is shown in Table 3.

[Evaluation of Phase Transition]

The evaluation of the phase transition in the present example was performed in the same manner as in the inventive example 1. As a result, within the temperature range from −30° C. to 80° C., in all the inventive examples 3-1 to 3-18, no sudden change in conductivity indicating a phase change (i.e., phase transition) was observed.

[Evaluation of Composition]

Composition analysis of each of the solid electrolyte materials of the inventive example 3 was performed by the ICP emission spectroscopy. As a result, in each of the inventive examples 3-1 to 3-18, the deviation of Li/Y from the charged composition was within 3%. As a result, the charged composition with the planetary ball mill would be almost the same as composition of the solid electrolyte material described in each of the inventive examples.

[Production of Coating Layer of Positive Electrode Active Material Used for Production of Secondary Battery]

In an argon glove box, 0.06 mg of a metal Li (manufactured by The Honjo Chemical Corporation) and 2.87 mg of pentaethoxyniobium (manufactured by Kojundo Chemical Laboratory Co., Ltd.) were dissolved in 0.2 mL of super-dehydrated ethanol (manufactured by FUJIFILM Wako Pure Chemical Corporation) to provide a coating solution.

In an agate mortar, the prepared coating solution was gradually added to 100 mg of $Li(NiCoAl)O_2$, which was the positive electrode active material, while the prepared coating solution was stirred gradually.

After all the coating solution was added, stirring was performed on a hot plate of 30° C., until drying and solidification of all the coating solution were visually confirmed.

The dried and solidified powder was put in an alumina crucible and taken out in an air atmosphere.

Next, heat treatment was performed at 300° C. for 1 hour in an air atmosphere.

The powder after the heat treatment was reground in an agate mortar to provide a positive electrode active material of the inventive example 3 in which a coating layer was formed on the particle surface layer. In other words, a plurality of particles of the positive electrode active material were provided, and a coating layer was formed on at least a part of the particle surface of all or some of the plurality of the particles. The material of the coating layer is $LiNbO_3$.

[Production of Secondary Battery]

Hereinafter, the production and evaluation methods for the secondary batteries in the present example will be described.

In a glove box maintained in a dry and low-oxygen atmosphere with a dew point of −90° C. or less and an oxygen value of 5 ppm or less, the solid electrolyte material of the inventive example 3 and $Li(NiCoAl)O_2$, which was the positive electrode active material having particle surface coated with $LiNbO_3$, were prepared at a volume ratio of 30:70. These were mixed in an agate mortar to produce a positive electrode mixture.

The solid electrolyte materials of the inventive example 3 each of which corresponded to a thickness of 700 µm, and 12.3 mg of the positive electrode mixture were stacked in this order in respective insulating outer cylinder. Each of the solid electrolyte materials having the positive electrode mixture was pressure-molded at a pressure of 360 MPa to provide a positive electrode and a solid electrolyte layer.

Next, a metal In (thickness: 200 µm) was stacked on the opposite side to the side which was in contact with the positive electrode of the solid electrolyte layer. Each of the solid electrolyte materials having the positive electrode mixture and the metal In was pressure-molded at a pressure of 80 MPa to produce a stacking structure of the positive electrode, the solid electrolyte layer, and the negative electrode.

Next, stainless-steel current collectors were disposed on the upper and lower parts of each of the stacking structures, and current collector leads were attached to the current collectors. Finally, insulating ferrules were used to block and seal the insides of the insulating outer cylinders from the outside atmosphere.

Thus, the secondary batteries that use the materials of the inventive example 3 were produced.

[Charge/Discharge Test]

The secondary battery of the inventive example 3-4 was disposed in a constant temperature chamber at 25° C. Constant-current charge was performed at a current value of 0.05 C rate (20 hour rate) with respect to theoretical capacity of the battery, and the charge was terminated at a voltage of 3.7 V. Next, the battery was discharged at a current value of the same 0.05 C rate as the above, and the discharge was terminated at a voltage of 1.9 V. As a result, in the inventive example 3-4, an initial discharge capacity of 650 µAh was provided.

Using the above method, the same measurements were performed in the inventive examples 3-1 to 3-3 and 3-5 to 3-18, and good discharge capacity was provided in all the inventive examples.

<<Discussion>>

As understood from the comparison of the inventive examples 3-1 to 3-18 to the comparative example 1-1, it can be seen that no phase transition occurs in the solid electrolytes of the inventive examples 3-1 to 3-18 within the range of −30° C. to 80° C., whereas the phase transition occurs in the comparative example 1-1. In other words, it can be seen that the structure is stable in the assumed operation temperature range of the battery.

In addition, it can also be seen that the higher ionic conductivity of not less than $1 \times 10^{-4}$ S/cm is exhibited in all the inventive examples 3-1 to 3-18. In addition, in the inventive examples 3-3 to 3-5, 3-9 to 3-11 and 3-15 to 3-17, within the range of 0.8 d 1.5, the conductivity of not less than $7 \times 10^{-4}$ S/cm is exhibited.

In addition, in each of the solid electrolyte materials of the inventive examples 3-1 to 3-18, the charging/discharging operation of the battery was observed at room temperature. On the other hand, in the comparative example 1-1, the discharge capacity was hardly provided, and the battery operation failed to be observed.

From the above, it is shown that the solid electrolyte material according to the present disclosure is an electrolyte material that does not generate hydrogen sulfide and can stably maintain high lithium ion conductivity. Further, it is shown that an all-solid battery which does not generate hydrogen sulfide and is excellent in the charge/discharge characteristic can be realized.

INDUSTRIAL APPLICABILITY

The battery of the present disclosure can be used as, for example, an all-solid lithium secondary battery.

REFERENTIAL SIGNS LIST

100 Solid electrolyte particles
201 Positive electrode
202 Electrolyte layer
203 Negative electrode
204 Positive electrode active material particles
205 Negative electrode active material particles
300 Pressure-molding die
301 Frame
302 Lower punch part
303 Upper punch part
1000 battery

The invention claimed is:

1. A solid electrolyte material represented by the following composition formula (1):

$$Li_{6-3d}Y_dX_6 \qquad \text{Formula (1)}$$

where
X is two or more kinds of elements selected from the group consisting of Cl, Br, and I, and
0<d<1 or 1<d<2.

2. The solid electrolyte material according to claim 1, wherein
0.3≤d<1 or 1<d≤1.8 is satisfied.

3. The solid electrolyte material according to claim 2, wherein
0.5≤d<1 or 1<d≤1.5 is satisfied.

4. The solid electrolyte material according to claim 3, wherein
0.9≤d<1 or 1<d≤1.2 is satisfied.

5. The solid electrolyte material according to claim 1, wherein
X includes Br and Cl.

6. The solid electrolyte material according to claim 5, represented by the following composition formula (2):

$$Li_{6-3d}Y_dBr_{6-x}Cl_x \qquad \text{Formula (2)}$$

where
1≤x≤5.

7. The solid electrolyte material according to claim 1, wherein
X includes Br and I.

8. The solid electrolyte material according to claim 7, represented by the following composition formula (3):

$$Li_{6-3d}Y_dBr_{6-x}I_x \quad \text{Formula (3)}$$

where
1≤x≤5.

9. The solid electrolyte material according to claim 1, represented by the following composition formula (4):

$$Li_{6-3d}Y_dCl_lBr_mI_n \quad \text{Formula (4)}$$

where
l+m+n=6.

10. The solid electrolyte material according to claim 9, wherein
0.5<l<5, 0.5<m<5, and 0.5<n<5 are satisfied.

11. The solid electrolyte material according to claim 10, wherein
2≤l≤3, 2≤m≤3, and 1≤n≤2 are satisfied.

12. The solid electrolyte material according to claim 11, wherein
l=2, m=2, and n=2 are satisfied.

13. A battery, comprising:
a positive electrode;
a negative electrode; and
an electrolyte layer provided between the positive electrode and the negative electrode,
wherein
at least one selected from the group consisting of the positive electrode, the negative electrode, and the electrolyte layer includes the solid electrolyte material according to claim 1.

14. The battery according to claim 13, wherein
the positive electrode includes:
a particle of a positive electrode active material comprising Li-containing transition metal oxides, transition metal fluorides, polyanion materials, fluorinated polyanion materials, transition metal sulfides, transition metal oxyfluorides, transition metal oxysulfides, or transition metal oxynitrides; and
a Li-containing metal oxide coating at least a part of the particle.

15. The battery according to claim 14, wherein
the positive electrode active material is $Li(NiCoAl)O_2$.

16. The battery according to claim 14, wherein
the Li-containing metal oxide is $LiNbO_3$.

* * * * *